United States Patent

Bulharowski

[15] 3,670,101

[45] June 13, 1972

[54] FILM SCANNING SYSTEM LINEARITY APPARATUS

[72] Inventor: John Francis Bulharowski, Rochester, N.Y.

[73] Assignee: Sylvania Electric Products Inc.

[22] Filed: Sept. 14, 1970

[21] Appl. No.: 71,761

[52] U.S. Cl. ........................................178/7.2, 178/DIG. 28

[51] Int. Cl. ........................................................H04n 5/84

[58] Field of Search ......................178/7.2 D, DIG. 28, 5.2 D, 178/7.85, 7.92, 7.2, 7.6, 6.7 A

[56] References Cited

UNITED STATES PATENTS

| | | | |
|---|---|---|---|
| 3,328,585 | 6/1967 | Briguglio | 178/7.2 |
| 2,843,006 | 7/1958 | Tyler | 178/7.2 D |

*Primary Examiner*—Robert L. Griffin
*Assistant Examiner*—Richard P. Lange
*Attorney*—Norman J. O'Malley, Robert E. Walrath and Thomas H. Buffton

[57] ABSTRACT

In a flying spot scanner system having a flying spot scanner tube with a curved faceplate, film scanning linearity and focus is improved by a film guide means having an outwardly curved surface exerting an outward and guiding force on a continuously moving photographic film.

1 Claim, 7 Drawing Figures

INVENTOR.
JOHN F. BULHAROWSKI

BY
Robert E. Walrath

ATTORNEY

FILM SCANNING SYSTEM LINEARITY APPARATUS

CROSS REFERENCE TO RELATED APPLICATION

A co-pending application entitled "Variable Speed Continuous Motion Film and Television Scan Synchronization," filed Apr. 15, 1970, Ser. No. 28,864, provides a flying spot scanner system wherein is employed a flying spot scanner tube in which this invention is useful.

BACKGROUND OF THE INVENTION

In light scanning and particularly flying spot scanner systems employing photographic film, it is a common practice to use a flying spot scanner tube having a relatively flat faceplate as a light source. The light available from the relatively flat faceplate is directed onto a film spaced substantially parallel therefrom which provides signals representative of image information on the film. These signals are detected and processed to provide a viewer with a visual image display derived from the image information on the film.

In another well known technique, a flying spot scanner tube having a curved faceplate is employed with a compensating lens system disposed intermediate the curved faceplate of a flying spot scanner tube and a laterally spaced relatively flat photographic film. The compensating lens attempts to achieve accommodation of the curved faceplate and the flat film to provide scanning of a plurality of successive film frames in a manner which minimizes variations in scanning linearity therebetween.

Although the above-mentioned techniques of employing a flying spot scanner tube with a relatively flat faceplate and the compensating lens technique are widely known, it has been found that there are flying spot scanner systems wherein either or both methods leave something to be desired. More specifically, a flying spot scanner tube having a relatively flat faceplate compares unfavorably in cost with a flying spot scanner tube having a curved faceplate. In addition, more extensive electronic distortion or so-called pincushion correction is needed with a tube with flat face. Also, a compensating lens system for effecting compatibility of a curved faceplate and a relatively flat film adds both complexity and undesired cost to the flying spot scanner system.

OBJECTS AND SUMMARY OF THE INVENTION

An object of the present invention is to enhance linearity and focus in a light scanning system. Another object of the invention is to provide improved linearity in a flying spot scanner system at a relatively low cost and with a minimum of complexity. A further object of the invention is to provide improved guidance and pressure for conveying film in a flying spot scanner system having a flying spot scanner tube with a curved faceplate.

These and other objects, advantages and capabilities are achieved in one aspect of the invention by film linearity apparatus including a film guide means having an outwardly curved surface with a channel therein for exerting an outward pressure on and guiding a film over the curved surface.

PREFERRED EMBODIMENT OF THE INVENTION

For a better understanding of the present invention, together with other and further objects, advantages and capabilities thereof, reference is made to the following disclosure and appended claims in connection with the accompanying drawings.

Figure 1:
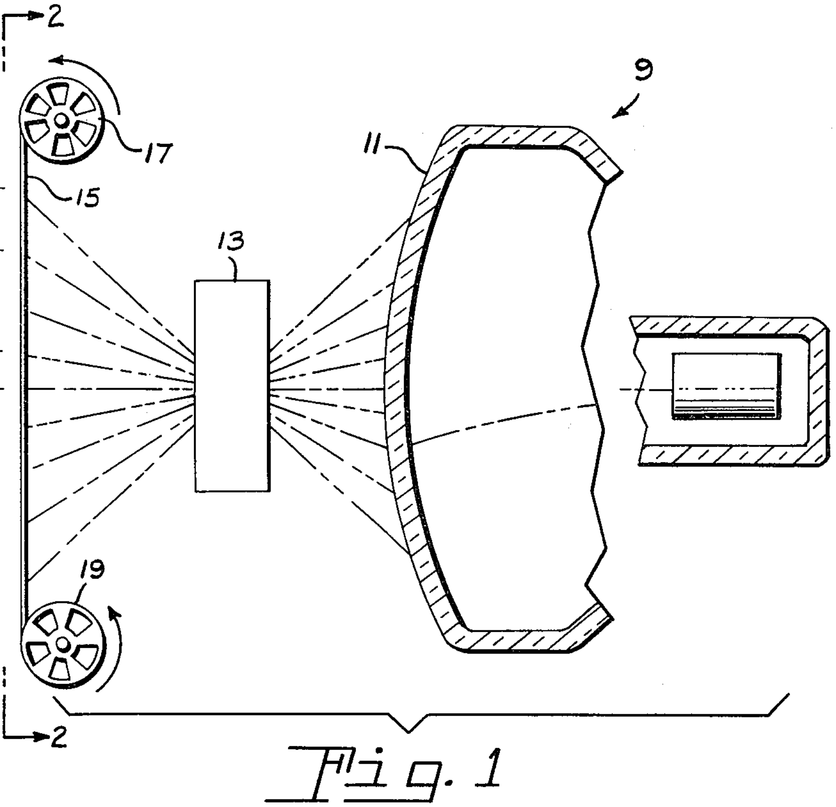
FIG. 1 is an illustration, exaggerated, of a prior art film scanner system employing a curved faceplate scanner tube and a flat photographic film.

Referring to the drawings, the prior art illustration of FIG. 1 includes a flying spot scanner tube 9 having a curved faceplate 11, a lens 13 for directing light beams derived from the faceplate 11 onto a photographic film 15 laterally spaced from the faceplate 11. Also, the film 15 is in a plane substantially normal to the longitudinal axis of the scanner tube 9 and continuously moved by a transport means which includes a pair of reels, 17 and 19 respectively.

Figure 2:
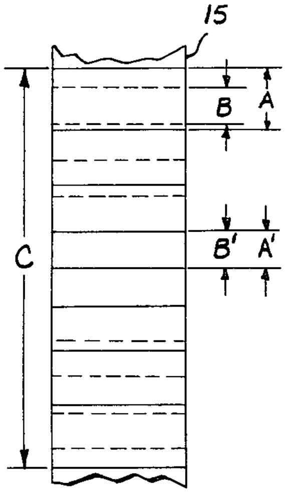
FIG. 2 is a sectional view, along the line 2—2, of the prior art embodiment of FIG. 1.

As can readily be seen in FIG. 1 and the sectional view of FIG. 2, electron beams striking the curved faceplate 11 of the scanner tube 9 become increasingly divergent as the vertical distance from the longitudinal axis of the scanner tube 9 increases. In turn, light beams emanating from the curved faceplate 11, passing through the lens 13 and striking the substantially planar film 15 also become increasingly divergent as the distance from the longitudinal axis increases. As a result, the light scanned area A of the film, 15 of FIG. 2, is greater than the area of a film frame, B of FIG. 2, at the extremities of a film scanning zone C while the scanned area A' and film frame area B' are substantially identical near the longitudinal axis of the scanner tube 9.

Thus, it can readily be understood that the non-uniformity of the light scanned area A and the film frame area B throughout the scanning zone C (exaggerated) would result in non-uniformity of film frame scanning which may be referred to as "jitter." Since light scanning is provided throughout the length of the scanning zone C, it can be seen that such "jitter" or non-linearity is highly undesirable to a viewer. Moreover, the less expensive scanner tube 9 having a curved faceplate 11 is deleterious to the quality of the display when the film 15 is in a plane normal to the longitudinal axis of the tube 9.

Figures 3, 4:
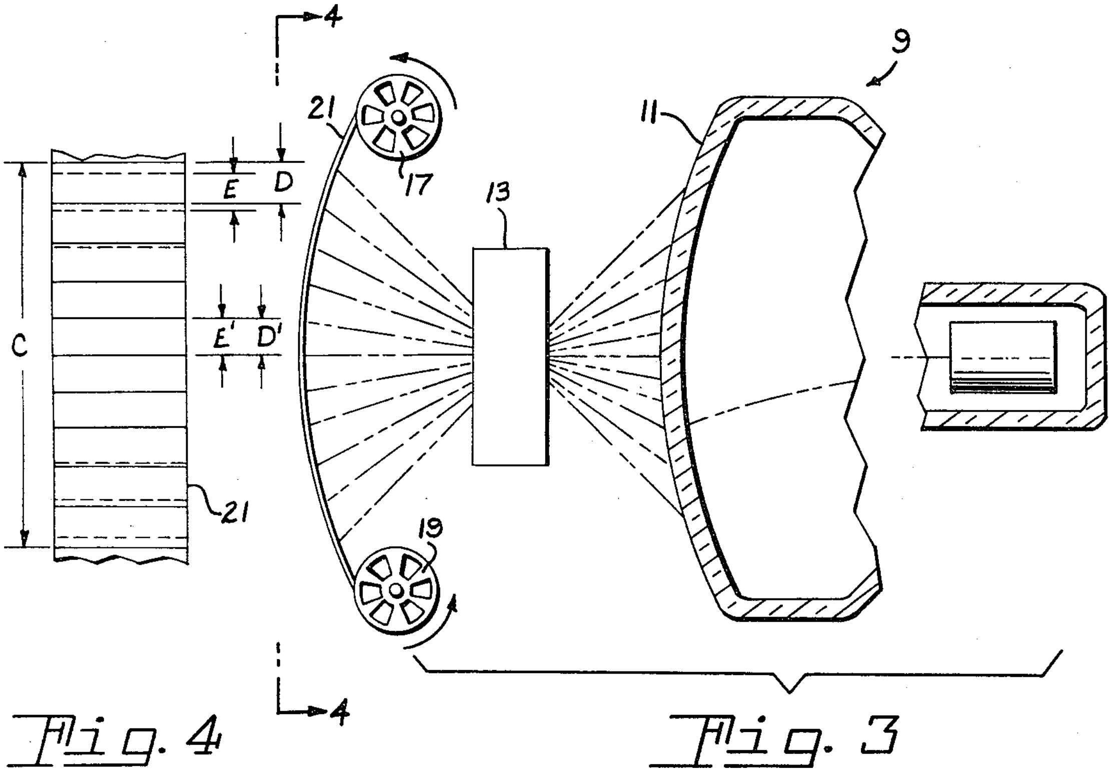
FIG. 3 illustrates, in exaggerated form, a film scanner system employing a light scanning tube with a curved faceplate, and a film guided along a curved surface.
FIG. 4 is a sectional view, along the line 4—4 of the embodiment of FIG. 3.

FIG. 3 illustrates a flying spot scanner tube 9 having a curved faceplate 11. A lens 13 is placed adjacent the curved faceplate 11 and a film of film frames 21 is disposed along an outwardly extending arc and continuously moved by a pair of reels, 17 and 19 respectively.

As can readily be seen in the sectional view of FIG. 4, the increased divergence of the light beams farthest from the longitudinal axis of the flying spot scanner tube 9 results in a light scanned area D which is only slightly greater than the film frame area E at the extremities of a film scanning zone C. Also, the light scanned area D' and the film frame area E' at the longitudinal axis of the scanner tube 9 are again substantially equal. Thus, the outwardly extending arc of the film of film frames 21 acts in conjunction with the curved faceplate 11 of the scanner tube 9 to greatly reduce the so-called "jitter" or non-linearity due to non-uniformity of the light scanned and film frame areas D and E at the extremities of the film scanning zone C.

Figure 5:
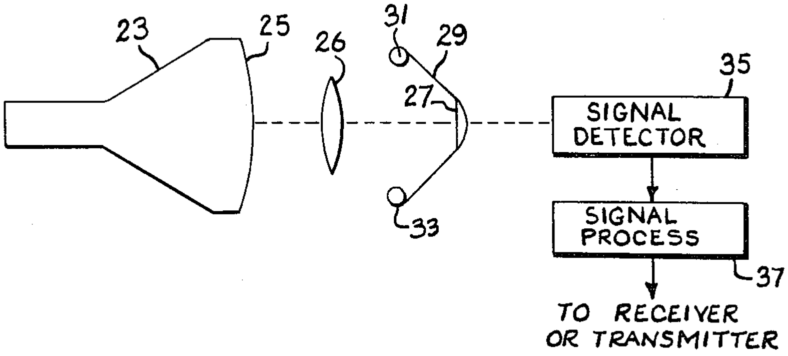
FIG. 5 is a diagrammatic view of a flying spot scanner system employing a preferred form of film linearity apparatus.

In FIG. 5, a flying spot scanner system includes a flying spot scanner tube 23 having a curved faceplate 25. A lens 26 is disposed adjacent the curved faceplate 25 and a film guide means 27 exerts an outwardly extending force on film of film frames 29 transported intermediate a pair of film reels 31 and 33. A signal detector stage 35 is disposed on the side of the film of film frames 29 opposite to the film guide means 27 and coupled to a signal processing network 37. The signal processing network 37 provides output signals representative of image information derived from the film of film frames 29.

Figure 6:
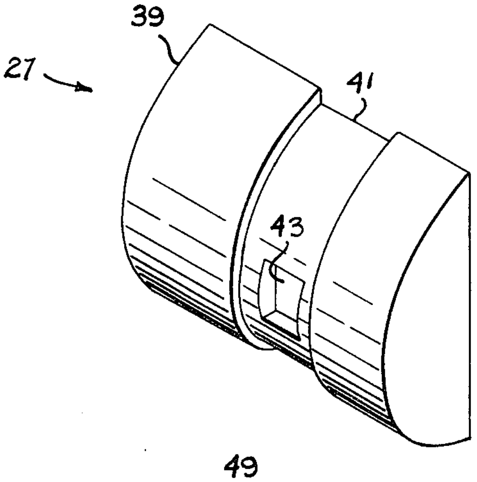
FIG. 6 illustrates, in detail, a preferred form of film guide means.

As a specific embodiment of a preferred film guide means 27, FIG. 6 illustrates a film guide means 27 having a substantially semi-circular configuration with a curved surface 39 and a film guide channel 41 cut into the curved surface 39. An aperture 43 extends through the film guide means 27, and a film of film frames 29 is conveyed over the aperture 43 by way of the film guide channel 41.

Figure 7:
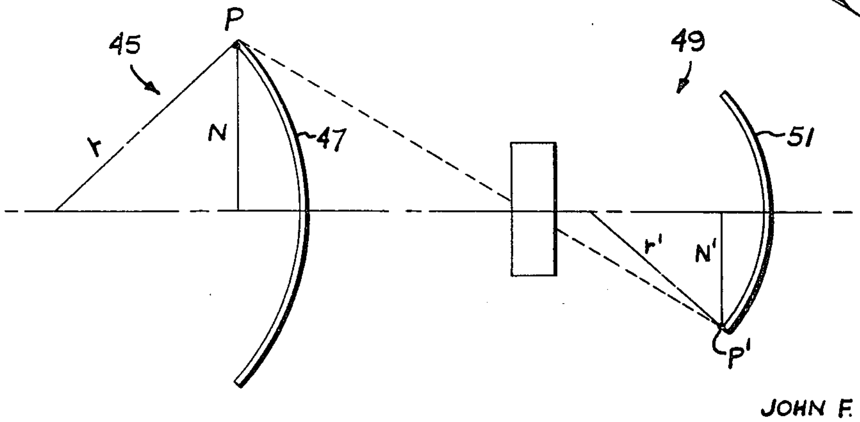
FIG. 7 diagrammatically illustrates the relationship of a curved faceplate of a flying spot scanner tube and the curved surface of a preferred film guide means.

As to determination of the curved surface 39 of the film guide means 27, reference is made to the diagrammatic illustration of FIG. 7. Therein, a flying spot scanner tube 45 has a curved faceplate 47 with a radius of curvature r and a point P disposed a vertical distance N from the longitudinal axis. Also, the film guide means 49 has a curved surface 51 with a radius of curvature $r'$ and a point P' disposed at a vertical distance N' from the longitudinal axis.

It can readily be determined that an estimated value of the radius of curvature $r'$ of the curved surface 51 of the film guide means 49 is substantially equal to the product of the radius of curvature r of the curved faceplate 47 and the optical reduction factor or the ratio of vertical distance N' of the point P' to the vertical distance N of the point P. In other words:

$$r' = r\,N'/N$$

Thus, measurement of the vertical distance N on the curved faceplate 47 and the reduced vertical distance N' in conjunction with the radius of curvature $r$ of the faceplate 47 provides information sufficient for an approximation of the radius of curvature $r'$ of the film guide means 49. Once having determined this approximate radius $r'$, the apparatus is adjusted to provide proper focus at the longitudinal axis and then checked for focus at the extremities of the viewing zone whereupon any further adjustment in the radius of curvature $r'$ will be readily discernable.

Thus, there has been provided a unique linearity apparatus for a flying spot scanner system employing a flying spot scanner tube having a curved faceplate. The linearity apparatus includes a film guide means wherein a curved surface having a guide channel therein not only guides a film but also exerts an outward force thereon, Thus, the outward force exerted by the curved surface on the film eliminates or at least greatly reduces the need for various film gate and film pressure apparatus normally employed with films. Moreover, the vertical curvature of the film tends to provide compensation for a less expensive scanner tube having a curved faceplate whereby linearity throughout a film scanning zone is enhanced.

While there has been shown and described what is at present considered to be the preferred embodiment of the invention, it will be obvious to those skilled in the art that various changes and modifications may be made therein without departing from the invention as defined by the appended claims.

I claim:

1. In a flying spot scanner system including a flying spot scanner tube having a curved faceplate providing a light source, a lens associated with the faceplate, a photographic film spaced from the lens, and a signal detector spaced from the photographic film, film scanning linearity and focus apparatus in the form of a film guide means positionally located intermediate the lens and the film, said film guide means having an outwardly curved surface substantially semi-circular in form with an aperture therethrough and a channel extending along said curved surface in alignment with said aperture and exerting an outward force on and the guiding the conveyance of said photographic film wherein said film guide means includes a curved surface having a radius of curvature substantially porportional to the product of the radius of curvature of the faceplate of the flying spot scanner tube and the optical reduction of the flying spot scanner system.

* * * * *